United States Patent [19]

Marshall

[11] Patent Number: 5,277,066
[45] Date of Patent: * Jan. 11, 1994

[54] VIBRATION TEST FIXTURE

[75] Inventor: Philip Marshall, Lexington, Mass.

[73] Assignee: M/RAD Corporation, Woburn, Mass.

[*] Notice: The portion of the term of this patent subsequent to Oct. 20, 2009 has been disclaimed.

[21] Appl. No.: 937,996

[22] Filed: Aug. 28, 1992

Related U.S. Application Data

[63] Continuation-in-part of Ser. No. 731,372, Jul. 16, 1991, Pat. No. 5,156,051, which is a continuation of Ser. No. 622,366, Dec. 5, 1990, abandoned, which is a continuation of Ser. No. 362,757, Jun. 7, 1989, abandoned.

[51] Int. Cl.⁵ .............................................. G01N 29/00
[52] U.S. Cl. .......................................... 73/663; 73/662
[58] Field of Search ................ 73/662, 663, 665, 667, 73/668

[56] References Cited

U.S. PATENT DOCUMENTS

| | | | |
|---|---|---|---|
| 3,712,120 | 1/1973 | Fletcher et al. | 73/663 |
| 4,848,160 | 7/1989 | Marshall et al. | 73/663 |
| 5,024,096 | 6/1991 | Gregory et al. | 73/665 |
| 5,083,463 | 1/1992 | Marshall et al. | 73/663 |
| 5,156,051 | 10/1992 | Marshall | 73/663 |

FOREIGN PATENT DOCUMENTS

| | | | |
|---|---|---|---|
| 1174807A | 8/1985 | U.S.S.R. | 73/663 |
| 1538078 | 1/1990 | U.S.S.R. | 73/663 |

*Primary Examiner*—Herzon E. Williams
*Assistant Examiner*—George Dombroske
*Attorney, Agent, or Firm*—Pandiscio & Pandiscio

[57] ABSTRACT

A vibration test apparatus for applying simultaneously three equal mutually-orthogonal vibration forces to each of at least two test objects so that each of said forces extends parallel to a corresponding respective one of mutually-orthogonal X, Y and Z axes of each test object. The apparatus comprises a fixture adapted for attachment to a conventional shaker table or a sliptable that has two or four object-supporting plates disposed in a selected angular relationship with the shaker table or sliptable. This angular relationship is selected so that the input vibration force generated by the shaker table is translated into the three equal forces, each of which extends parallel to a corresponding respective one of the three mutually-orthogonal axes of each test object secured to said fixture.

8 Claims, 5 Drawing Sheets

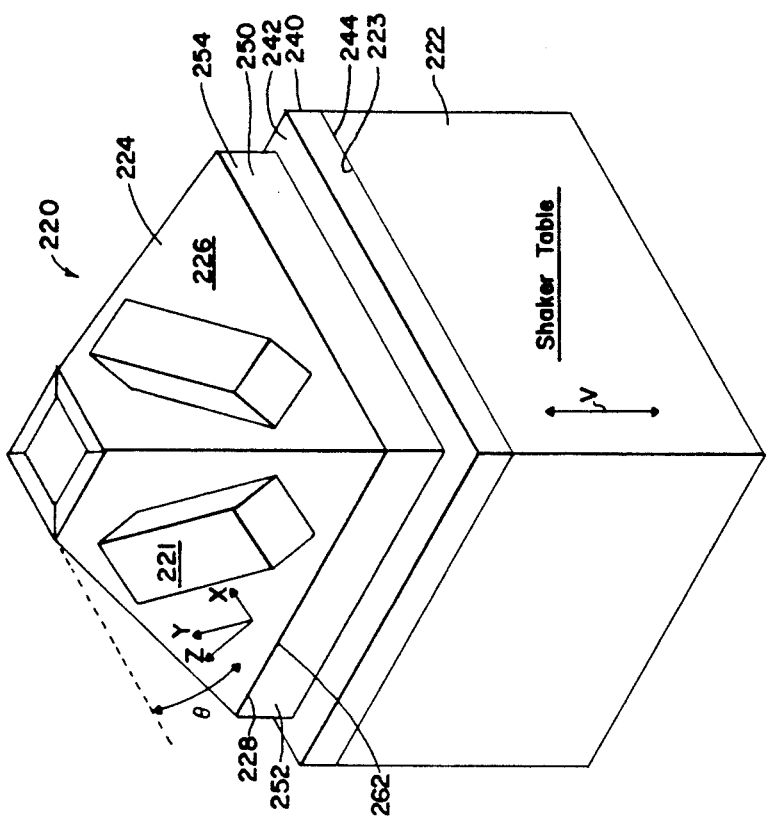
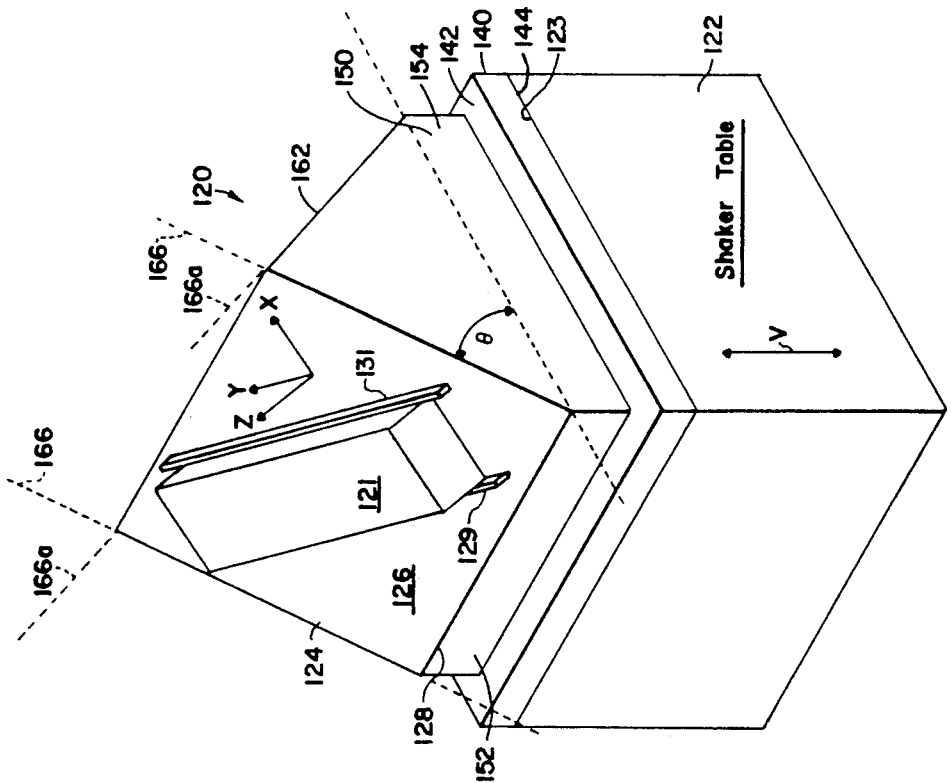

VIBRATION TEST FIXTURE

This is a continuation-in-part of my copending application Ser. No 07/731,372, now U.S. Pat. No. 5,156,051, filed Jul. 16, 1991, which was a continuation of application Ser. No. 07/622,366, filed Dec. 5, 1990 (now abandoned), which was in turn a continuation of application Ser. No. 07/362,757, filed Jun. 7, 1989 (now abandoned).

FIELD OF THE INVENTION

The present invention relates to apparatus for vibration testing selected objects, and more particularly to fixtures and jigs used in conjunction with apparatus for generating a vibration force.

BACKGROUND OF THE INVENTION

In conjunction with the design and testing of various products, e.g. consumer electronic goods and military products, vibration forces are applied to the product along selected axes thereof to determine if the product can tolerate such forces and continue to function properly. Because it is typically time consuming and somewhat difficult to attach and detach an object to be vibration tested to and from a vibration source, e.g. a shaker table, fixtures have been developed for facilitating the mechanical coupling the object with the vibration source. These fixtures generally comprise a base which is securely attached to the vibration source and at least one mounting surface to which the object to be vibration tested can be quickly and easily attached.

One such fixture is disclosed in British Patent Application No. 8,522,501, filed Sep. 11, 1985. This fixture has a cubic shape. The object to be vibration tested is attached to one face of the cube and another face of the cube is secured to a vibration source. By releasing the fixture from the vibration source after a vibration test is completed and rotating the cube about its diagonal axis 120 degrees, a new face of the cube is positioned for attachment to the vibration source. By this selective rotation of the cubic fixture, vibration forces can be selectively applied along three mutually-orthogonal axes of the object without the need for removing the object from the test fixture after each test. Rotation of the cubic fixture is effected either manually or by means of an electric motor.

Another vibration test apparatus is disclosed in U.S. Pat. No. 4,848,160, entitled "Multi-Axis Test Fixture System", issued on Jul. 18, 1989 to M/RAD Corporation of Woburn, Mass. (the assignee of this application). The latter apparatus comprises a cubic fixture for supporting an object to be vibration tested, a head expander positioned between the cubic fixture and a vibration source, an index assembly for raising the cubic fixture away from and lowering the cubic fixture onto the head expander, and a rotation assembly for rotating the cubic fixture about its diagonal axis when the fixture is raised above the head expander. The apparatus also includes a controller for automatically raising, rotating and lowering the cubic fixture so that vibration testing can be performed along three mutually-orthogonal axes of the test object without detaching the object or the cubic fixture on which it is supported from the vibration source during the three-test sequence.

The vibration test apparatus of U.S. Pat. No. 4,848,160 functions satisfactorily in most circumstances. However, where, for instance, objects are vibration tested in assembly-line fashion using unskilled or low-skilled personnel, it has been determined that the apparatus described in U.S. Pat. No. 4,848,160 can be too complicated for the average employee to operate. Accordingly, most vibration testing must be performed using fixtures which require detachment of the test object and/or fixture after a vibration test is performed along each of the axes of the object which are of interest. Clearly, where a multiple axis vibration test is to be performed, it is undesirable from a work efficiency perspective to attach and detach an object after the vibration test on each axis.

My prior copending application Ser. No. 07/731,372, now U.S. Pat. No. 5,156,051, discloses a vibration test fixture adapted for attachment to a conventional shaker table, or a conventional sliptable attached to a shaker table, which fixture is designed to support a test object so that the object can be vibration tested along three mutually-orthogonal axes in a single vibration test procedure without repositioning the object during the procedure. That test fixture is designed so as to simultaneously apply three equal vibration forces extending along mutually-orthogonal axes to a test object having mutually-orthogonal X, Y and Z axes so that the three vibration forces extend along or in parallel with a corresponding respective one of the X, Y and Z axes of the test object. The test fixture disclosed in said application Ser. No 07/731,372, now U.S. Pat. No. 5,156,051, comprises a flat object-supporting plate having a straight bottom edge and means for securing a test object in a selected fixed relationship on that plate so that the X and Y axes thereof form a 45° angle with the bottom edge of the flat plate.

In one embodiment of the test fixture invention disclosed in my prior copending application Ser. No. 07/731,372, the flat object-supporting plate (and hence a test object secured to that plate) is inclined at about a 54.7° angle with respect to the mounting surface of the shaker table to which the test fixture is secured. As a result of this inclination, the Z axis of the test object is inclined at about 35.3° with respect to the mounting surface of the shaker table. In another embodiment of the invention disclosed in said application Ser. No. 07/731,372, now U.S. Pat. No. 5,156,051, the test fixture is secured to a slip table mounted to a shaker and is arranged so that its flat object-supporting surface (and hence a test object secured to that surface) is inclined at about a 35.3° angle with respect to the mounting surface of the sliptable. As a result of this inclination the Z axis of the test object is inclined at about a 54.7° angle with respect to the mounting surface of the sliptable. By so supporting the test object with respect to the mounting surface of the shaker table or sliptable, and thus with respect to the axis of the vibration force, each of three equal, mutually-orthogonal vibration force components of the input vibration force are coupled to the test object along or in parallel with corresponding respective ones of the X, Y and Z axes of the test object. The test fixture invention described and claimed in my prior copending application Ser. No. 07/731,372, now U.S. Pat. No. 5,156,051, has been a commercial success.

OBJECTS AND SUMMARY OF THE INVENTION

I have determined that the invention described in said prior copending application Ser. No. 07/731,372, now U.S. Pat. No. 5,156,051, may be extended to provide a vibration test fixture that is adapted to permit multi-axis vibration testing of more than one test object or specimen in a single test procedure.

Accordingly the primary object of this invention is to provide a vibration test fixture for shaker tables and slip tables that is designed to support more than one test specimen so that all of the test specimens are subjected simultaneously to vibration forces that extend along or in parallel with corresponding respective ones of the X, Y and Z axes of the test objects.

A more specific object of this invention is to provide a vibration test fixture for simultaneously testing more than one object having mutually orthogonal X, Y and Z axes, wherein the test fixture is intended for attachment to a flat table that forms part of or is attached to a shaker device that is capable of producing a vibration force along a selected axis that is transmitted to the attached test fixture as an input vibration force, the test fixture being characterized by and comprising at least two flat surfaces each having an edge surface that extends parallel and transversely to the shaker table and at least two object-supporting means for securing test objects to each of said surfaces so that the X and Y axes of each test object forms a 45° angle with said edge surfaces along the plane of the flat surface to which it is secured and also with the flat table of the shaker table or the sliptable, said flat surfaces being disposed so that three equal, mutually-orthogonal vibration force components of the input vibration force produced by the shaker device extend along or in parallel with the X, Y and Z axes of each test object.

Another object of the present invention is to provide a vibration test fixture adapted for attachment to a shaker device in the form of a conventional shaker table or a conventional sliptable attached to a shaker table, which fixture is designed to support more than one test object and to permit tri-axis vibration testing of all of those objects simultaneously without repositioning the objects during the test procedure.

Still another object of the present invention is to provide a vibration test apparatus comprising a shaker device and a vibration test fixture attached to the shaker device for simultaneously applying three equal vibration forces along three mutually-orthogonal axes to more than one test object having mutually-orthogonal X, Y and Z axes so that the three vibration forces extend along or in parallel with a corresponding respective one of the X, Y and Z axes of each test object.

These and other objects of the invention are achieved by provision of a vibration test fixture of the type described for use with a shaker device having a flat table to which the test fixture is coupled, the test fixture comprising two or four flat surfaces each having a straight bottom edge and means associated for securing a test object to each of said surfaces so that the X and Y axes of the test object form a 45° angle with that bottom edge and also with the flat table of the shaker device, with each of said flat surfaces being disposed so that its straight bottom edge is parallel to the plane of the table of the shaker device and so that the vibration force produced by operation of the shaker device is applied to each of said objects as three equal mutually-orthogonal vibration force components each extending along or in parallel with a different one of the X, Y and Z axes of the test object.

In one embodiment of the present invention for use with a shaker table that a vibration force extending along a vertical axis, i.e., along an axis that is perpendicular to the plane of the table part of the shaker table and parallel to the axis of vibration of the table, the test fixture comprises an assembly of two or four flat plates or surfaces, and means for securing a test object or test specimen to each of said plates or surfaces, with each test object being secured to a different one of said plates or surfaces so that the X and Y axes of the test object form a 45° angle with the shaker table or the sliptable, and each of the flat plates or surfaces being inclined at about a 54.7° angle with respect to the mounting surface of the shaker table to which the test fixture is secured. As a result of this inclination, the Z axis of the test object is inclined at an angle of about 35.3° with respect to the mounting surface of the shaker table.

In another alternative embodiment of the present invention for use with a shaker device having a sliptable characterized by a vibration force extending along a horizontal axis, i.e., along an axis that is parallel to the to the plane of the sliptable, the test fixture comprises an assembly of two flat plates or surfaces and means for attaching a test object to each of said plates or surfaces so that each object has its X and Y axes extending at a 45° angle to the plane of the flat plates or surfaces and also to the sliptable, the flat plates or surfaces being disposed so that each test object is inclined at about a 35.3° angle with respect to the plane of the sliptable. With this alternative embodiment, the Z axis of each test object is inclined at about a 54.7° angle with respect to the plane (mounting surface) of the sliptable.

With both embodiments, three equal, mutually-orthogonal vibration force components of the input vibration force of the shaker device will be applied along or in parallel with the X, Y and Z axes of each test object.

BRIEF DESCRIPTION OF THE DRAWINGS

For a fuller understanding of the nature and objects of the present invention, reference should be had to the following detailed description taken in connection with the accompanying drawings wherein:

FIG. 4 is a schematically perspective view of a vibration test apparatus comprising a conventional shaker table, and a vibration test fixture incorporating the present invention having two object-supporting flat plates or surfaces;

FIG. 5 is a schematically perspective view of a vibration test apparatus comprising a conventional shaker table and a vibration test fixture made in accordance with the present invention that is characterized by four object-supporting flat plates.

In the drawings like reference numerals refer to like parts.

DETAILED DESCRIPTION OF THE INVENTION

Figure 1:
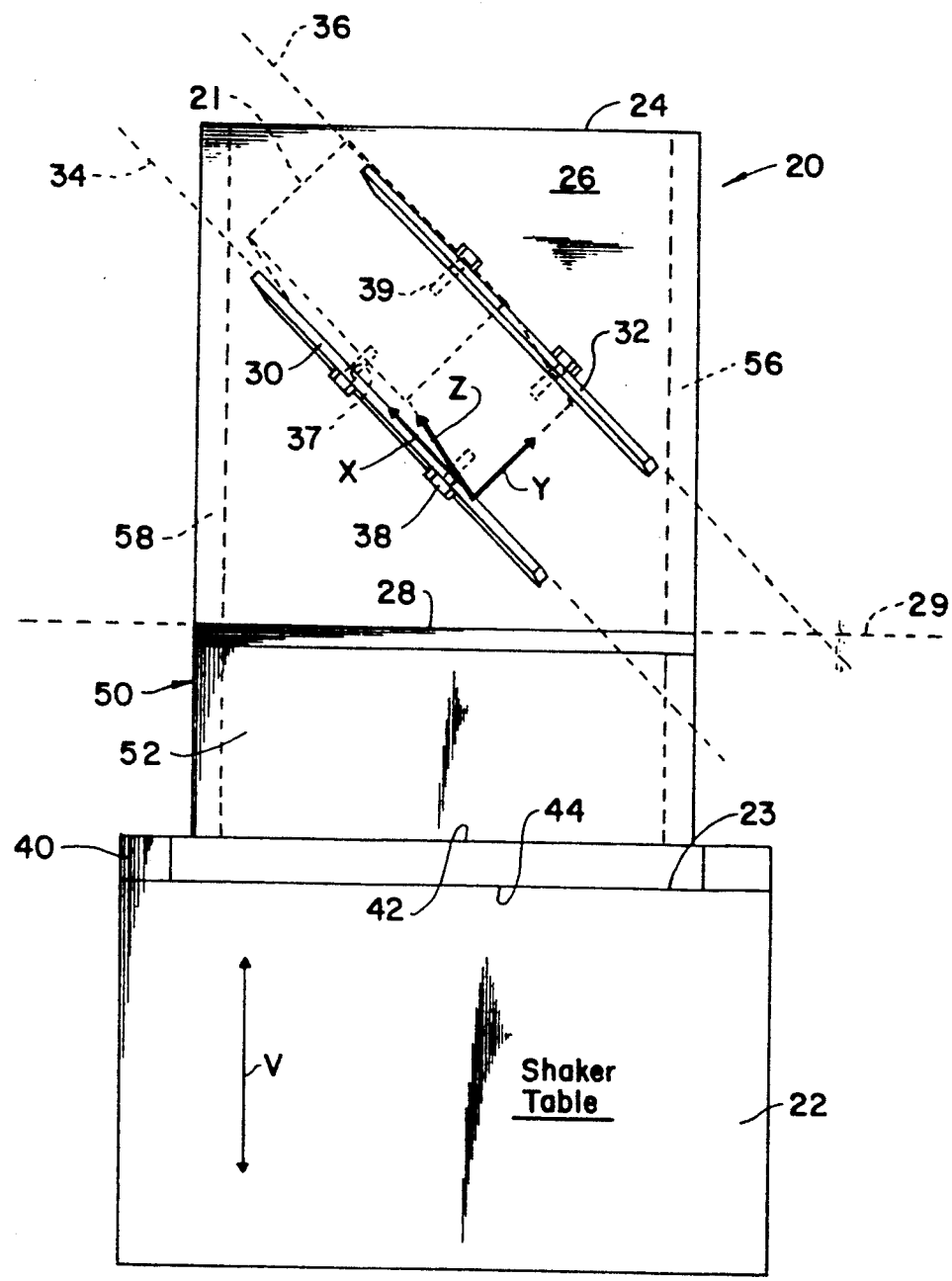
FIG. 1 is a front elevation view of a vibration test apparatus incorporating a conventional shaker table and one form of vibration test fixture disclosed in my prior copending application Ser. No. 07/731,372, now U.S. Pat. No. 5,156,051.
Figure 2:
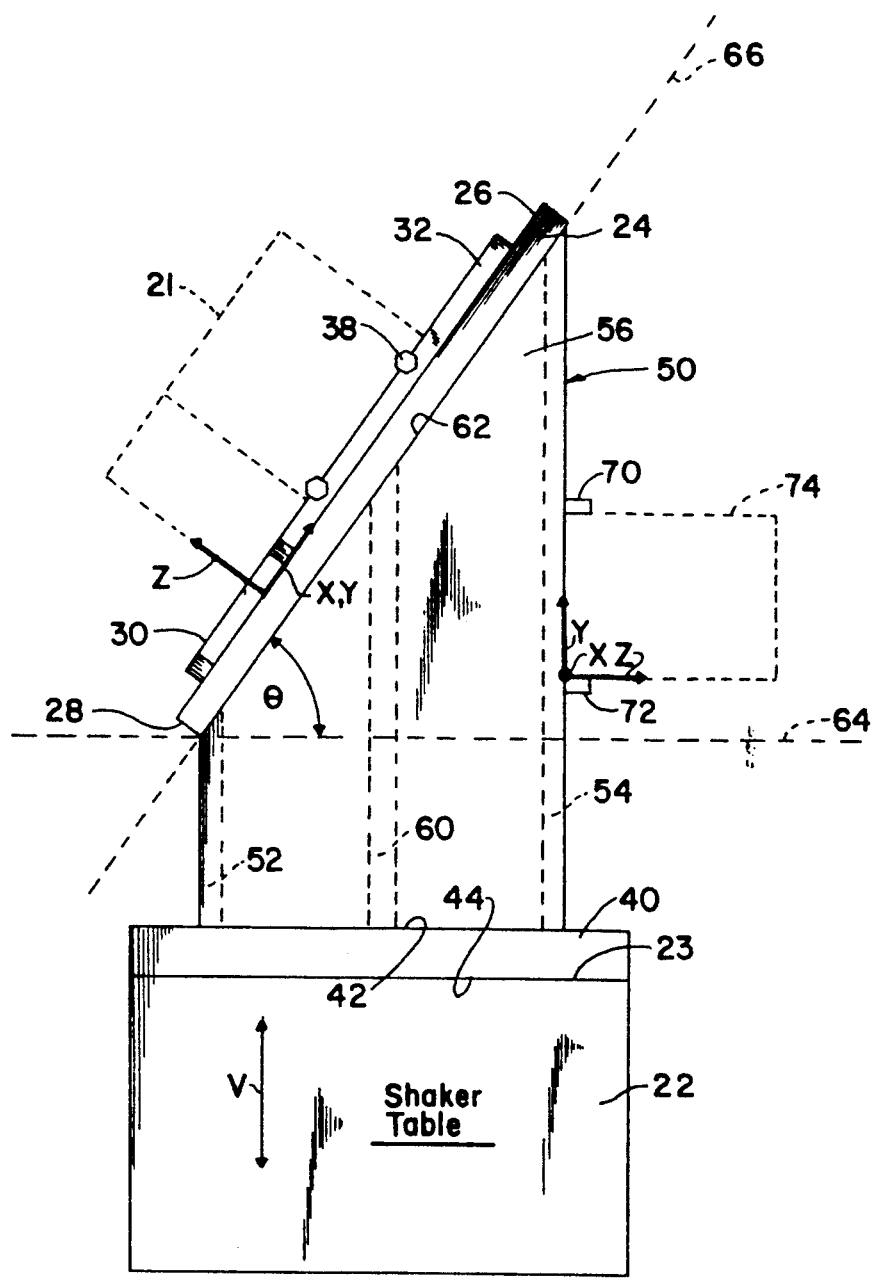
FIG. 2 is a side elevation view of the apparatus illustrated in FIG. 1.
Figure 3:
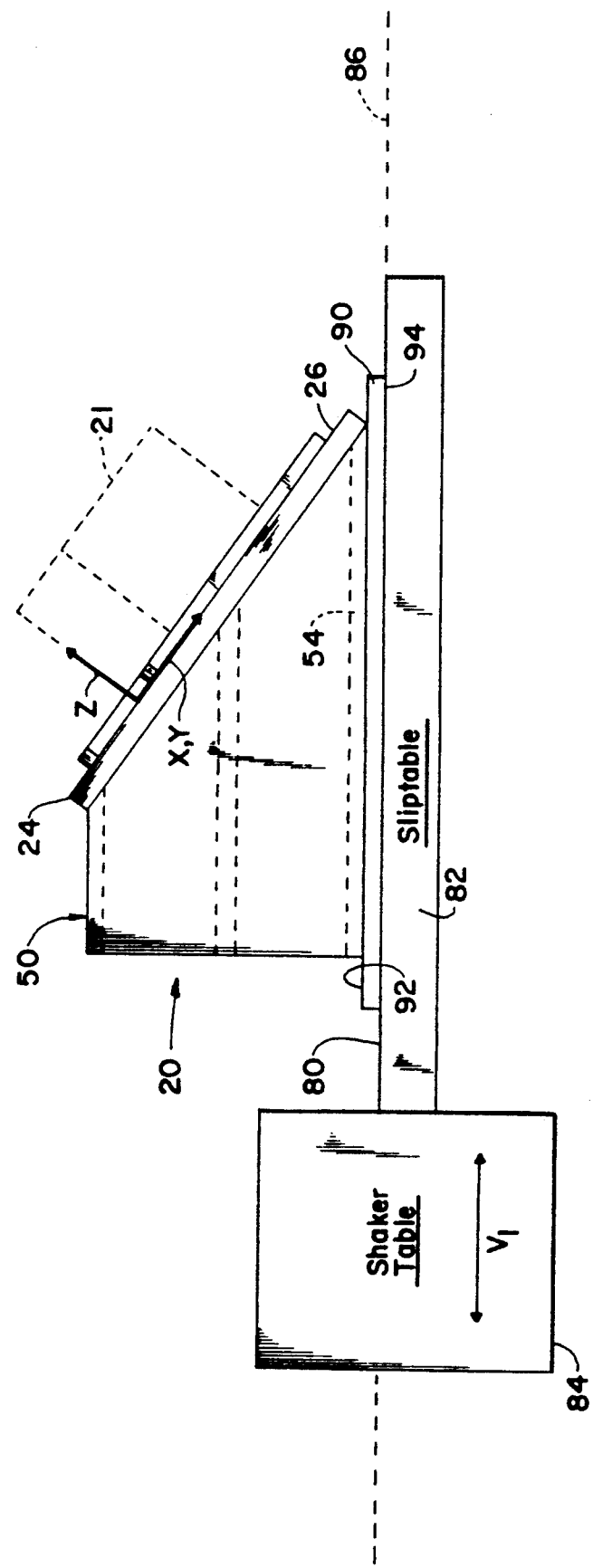
FIG. 3 is a side elevation view of a vibration test apparatus incorporating a conventional shaker table, a sliptable attached to the shaker table, and a second form of vibration test fixture for a slip table application disclosed in my prior copending application Ser. No. 07/731,372, now U.S. Pat. No. 5,156,051.

FIGS. 1 and 2 show a test fixture 20 as disclosed in my prior copending application Ser. No. 07/731,372, now U.S. Pat. No. 5,156,051. The illustrated fixture is adapted for use with a conventional shaker table 22, e.g., a shaker table of the type manufactured by Unholtz-Dickie Corporation of Wallingford, Conn. and identified by model number T-1000. Fixture 20 is designed to support a test object 21 having mutually-orthogonal X, Y and Z axes in fixed, predetermined relationship with respect to a substantially flat mounting surface on which fixture 20 is supported. As described in greater detail hereinafter, the mounting surface may be either the top surface 23 of a shaker table 22 or the top surface 80 of a sliptable 82 (FIG. 3).

Test fixture 20 comprises a top plate 24 for supporting a test object or specimen 21. Plate 24 has a substantially flat top surface 26 and is made from a material having suitable strength and vibration-transmissive characteristics, such as a magnesium plate having a thickness of about one inch. Top plate 24 comprises a substantially straight bottom edge 28 which extends along an axis 29 parallel to the top surface 23 of shaker table 22.

Fixture 20 comprises means for securing test object 21 to top plate 24 so that the X and Y axes of the object form a 45° angle with bottom edge axis 29. Such object-securing means may comprise, for example, a pair of elongate parallel members 30 and 32 attached to top surface 26 so as to confront top surface 26 along their entire length. Members 30 and 32 and are spaced apart a distance such that a test object 21 may be readily secured thereto, as described hereinafter. Members 30 and 32 are positioned so that their longitudinal axes 34 and 36 form a 45° angle with axis 29 and bottom edge 28.

Members 30 and 32 provide a structural connection by which a test object 21 can be quickly and easily attached to and detached from top surface 26 and by which the test object can be supported in fixed, selected angular relationship with top surface 26 and axis 29. To this end, members 30 and 32 include conventional mechanism and/or structure for securing object 21 to the members 30 and 32. Such mechanism and/or structure may comprise, for instance, a series of holes 37 in members 30 and 32 through which a corresponding number of bolts 38 are inserted and screwed into correspondingly positioned threaded apertures 39 in test object 21.

Holes 37 in members 30 and 32 and threaded apertures 39 in test object 21 are positioned so that when test object 21 is bolted to members 30 and 32, (a) the X axis of the object extends parallel to the longitudinal axes 34 and 36 of members 30 and 32, (b) the Y axis of the object extends normally to those longitudinal axes 34 and 36, and (c) the Z axis of the object extends normally (perpendicularly) to the plane of top surface 26. Additionally, as noted above, the X and Y axes of a test object 21 secured to members 30 and 32 form a 45° angle with respect to axis 29 of straight bottom edge 28.

As those of ordinary skill in the art will appreciate, the support means for attaching test object 21 to top plate 24 may comprise structure other than elongate members 30 and 32. Such alternative structure must support the object so that its X and Y axes extend at 45° angles to axis 29 and so that the Z axis of the test object extends normally to top surface 26 of top plate 24. Additionally, persons skilled in the art will readily appreciate that other connection means may be substituted in place of holes 37, bolts 38 and apertures 39 so long as the alternative means securely attach test object 21 to members 30 and 32 and ensure that object 21 remains aligned in the manner described above during the entire vibration test.

As noted above, test fixture 20 is adapted to be attached to either the mounting surface of a sliptable or a shaker table. When it is desired to attach test fixture 20 to the flat mounting surface 23 of a shaker table 22, fixture 20 comprises a bottom plate 40 having flat parallel top and bottom surfaces 42 and 44. Bottom plate 40 is adapted to be attached to mounting surface 23 of shaker table 22 by conventional means, e.g. by bolting plate 40 to mounting surface 23. When plate 40 is attached to mounting surface 23 of shaker table 22, top surface 42 of plate 40 extends parallel to mounting surface 23.

Test fixture 20 further comprises a support structure 50 for securing top plate 24 to bottom plate 40 and for supporting top plate 24 in fixed angular relationship with mounting surface 23 of shaker table 22. Briefly, support structure 50 may be in the general form of a box, the top portion of which above inclined plane 66 has been removed. Thus in FIGS. 1 and 2, the illustrated support structure 50 comprises front wall 52, rear wall 54, right wall 56, left wall 58 and intermediate wall 60. Walls 52, 54 and 60 are parallel with one another, and walls 56 and 58 are parallel with one another and extend normally to walls 52, 54 and 60. Walls 52, 54, 56, 58 and 60 are secured together by welding or other suitable method so as to form a rigid, box-like structure. Intermediate wall 60 is positioned to provide extra rigidity to the structure. Walls 52, 54, 56, 58 and 60 extend normally to top surface 42 of plate 40 and are attached to bottom plate 40 by welding or other suitable means. Preferably, walls 52-60 are made from metal plates having satisfactory strength and vibration-transmissive characteristics, e.g. one inch thick magnesium plates.

Front wall 52 is much shorter than rear wall 54, i.e. the top edge of the front wall is closer to top surface 42 of base plate 40 than is the top edge of rear wall 54. Right wall 56 has a top edge 62 that extends upwardly from the junction of wall 56 with front wall 52 to the junction of wall 56 with rear wall 54 so that top edge 62 forms an angle 8 with a plane 64 (FIG. 2) that extends parallel to top surface 42 of base plate 40. The top edge (not shown) of left wall 58 also extends upwardly at the same angle $\theta$ relative to plane 64. Angle $\theta$ is preferably equal to 54.7°, although some slight variation ($\pm 0.5°$) about this angle is acceptable. The top edges of walls 52, 54, 56, 58 and 60 all terminate at plane 66 which is inclined at angle $\theta$ with respect to plane 64. Top plate 24 is secured to top edges of walls 52-60 by bolting or other suitable means (e.g., welding) so that its top surface 26 extends parallel to plane 66 and so that the plate remains firmly attached to support member 50 during the entire vibration test.

By attaching top plate 24 to support member 50 in this manner, top surface 26 is inclined at the angle $\theta$ with respect to mounting surface 23 of shaker table 22. As a result of their attachment to surface 26, the means for attaching test object 21 to top plate 24 (e.g., elongate members 30 and 32 or equivalent) are also inclined at the angle $\theta$ relative to mounting surface 23. Similarly, because the Z axis of a test object 21 secured to elongate members 30 and 32 extends normally to top surface 26, the Z axis of the test object forms an angle of $90°-\theta$ with respect to the plane along which mounting surface 23 of shaker table 22 extends, e.g., 35.3° when $\theta=54.7°$.

The box-like support structure 50 optionally comprises a pair of mutually-parallel elongate members 70 and 72 for supporting a test object 74 having mutually orthogonal X, Y and Z axes in fixed orthogonal relationship with mounting surface 23 of shaker table 22. Elongate members 70 and 72 are attached to the outer surface of rear wall 54 so that the longitudinal axes thereof are parallel to one another and also parallel to top surface 42 of bottom plate 40. Members 70 and 72 contain conventional mounting structure (e.g. selectively positioned bolt holes and associated bolts) for releasably attaching a test object 74 thereto so that the X axis of the object extends normally to rear wall 54, so that the Y axis of the object extends normally to top surface 42 of bottom plate 40 and so that the Z axis of the object extends parallel to the long axes of members 70 and 72. As such, when a test object 74 is attached to members 70 and 72 the X, Y and Z axes of the object extend in orthogonal relationship with mounting surface 23 of shaker table 22. Of course, the object can be repositioned so that the X axis of the object extends normally to top surface 42 or parallel to the long axes of member 70 and 72.

To use the vibration test apparatus of FIGS. 1 and 2, bottom plate 40 is affixed to mounting surface 23 of shaker table 22 by conventional means, e.g. by bolting the plate to the mounting surface. Because top plate 24 is attached to support structure 50, and support structure 50 is attached to bottom plate 40, attaching bottom plate 40 to shaker table 22 attaches the entire test fixture 20 to the shaker table. As such, vibration forces V (FIGS. 1 and 2) generated by shaker table 22 are transmitted to a test object 21 via bottom plate 40, support structure 50, top plate 24, and the specimen-securing means (e.g. elongate members 30 and 32).

In the embodiment of FIGS. 1 and 2, vibration force V is generated by shaker table 22 so as to extend along an axis that extends normally to mounting surface 23, and hence normally to top surface 42 of bottom plate 40, as noted above. According to basic principles of vector mechanics, a given force can be broken down into different combinations of force components each having a unique pair of magnitude and orientation values. Adding these components together vectorially produces the original force. Thus, an upwardly acting vibration force V generated by shaker table 22 can be broken down into a set of three equal force components which extend along mutually orthogonal axes, which components when added together are equal to the original vibration force V. Each of these force components has a magnitude equal to about 0.577 times the magnitude of vibration force V.

Test fixture 20 is designed to support test object 21 relative to mounting surface 23, and hence to vibration force V, so that each of the three mutually orthogonal X, Y and Z axes of the test object extend along or in parallel with a corresponding respective one of the above-mentioned three equal, mutually-orthogonal force components of the upwardly acting vibration force V. Resultantly, vibration forces equal to 0.577 times the magnitude of vibration force V are applied simultaneously to test object 21 along each of the three mutually-orthogonal X, Y and Z axes thereof. Test object 21 is therefore vibration tested along its X, Y and Z axes simultaneously.

By supporting test object 21 in the manner described above with respect to mounting surface 23 of shaker table 22, vibration testing is simplified because the test object does not have to be repositioned after vibration testing along each of three mutually-orthogonal axes of the object. With prior known vibration test apparatus, an object is first vibration tested along its X axis, repositioned and vibration tested along its Y axis, and then repositioned again and vibration tested along its Z axis. Especially where vibration testing is performed by unskilled personnel or where it is essential that the vibration testing be performed in as little time as possible, the vibration test apparatus of the present invention is highly advantageous inasmuch as the test object does not have to be repositioned for testing along each of its three mutually orthogonal axes.

Elongate members 70 and 72 (FIG. 2) are arranged so that the three mutually-orthogonal axes of test object 74 are supported in orthogonal relationship with mounting surface 23 of shaker table 22. Consequently, test object 74 must be repositioned after a vibration test is completed along each of its three orthogonal axes. Although it is intended that test objects will generally be attached to elongate member 30 and 32 of fixture 20, elongate members 70 and 72 are provided in the event it is desired to perform a single or dual axis vibration test.

Referring now to FIG. 3, in certain circumstances it may be desirable to secure test fixture 20 to the top surface 80 of a sliptable 82. As is well known, sliptables are adapted to support an object being vibration tested so as to permit the object to be moved back and forth along a horizontal plane. Typically, the sliptable 82 is attached to a shaker table 84 which is oriented so that the vibration force $V_1$ which it generates extends along a horizontal plane. Thus, when the shaker table 84 is activated, it causes sliptable 82 to reciprocatably vibrate along horizontal plane 86.

In the case where it is attached to top surface 80 of sliptable 82, the test fixture 20 includes a back plate 90 which is attached by welding or other suitable means to back wall 54. Back plate 90 has flat top and bottom surfaces 92 and 94 and is made from a suitable vibration transmissive material such as one inch thick magnesium plate. Plate 90 forms a $90°-\theta$ angle with top surface 26 of top plate 24. As discussed above, $\theta$ is preferably equal to about 54.7°, with the result that bottom surface 94 forms about a 35.3° angle with top surface 26. As such, the Z axis of a test object 21 mounted to top plate 24 forms a 54.7° angle with bottom surface 94 and the X and Y axes of the test object form a 35.3° angle with bottom surface 94.

When test fixture 20 is to be mounted interchangeably to a shaker table and a sliptable, back plate 90 is provided in addition to bottom plate 40. Where test fixture 20 is to be mounted only on a sliptable, back plate 90 is provided in lieu of bottom plate 40.

Except for its orientation and the addition of back plate 90, the vibration test fixture illustrated in FIG. 3 is identical in structure to the test fixture described above and illustrated in FIGS. 1 and 2.

To use the vibration test fixture illustrated in FIG. 3, the fixture is positioned so that bottom surface 94 of back plate 90 contacts top surface 80 of sliptable 82, and plate 90 is then secured to the sliptable by conventional means, e.g. by bolting the two elements together. Shaker table 84 is then activated. The latter produces a horizontal vibration force $V_1$, which is transmitted to sliptable 82 so as to cause the latter to vibrate along a horizontal plane 86. This reciprocal vibration force is transmitted via back plate 90 to test fixture 20 and test object 21. As discussed above with respect to the embodiment of FIGS. 1 and 2, vibration force $V_1$, generated by shaker table 84, can be broken down into three equal, mutually-orthogonal X, Y and Z axes. When test fixture 20 is attached to sliptable 82 as shown, each of the three mutually orthogonal X, Y and Z axes of the test object 21 extend along or in parallel with a corresponding respective one of the above-mentioned three equal, mutually-orthogonal force components of the horizontal vibration force $V_1$. Resultantly, vibration forces equal to 0.577 times the magnitude of vibration force $V_1$ are applied simultaneously to test object 21 along each of the three mutually-orthogonal X, Y and Z axes thereof. Test object 21 may, therefore be vibration tested along its X, Y and Z axes simultaneously.

The vibration test fixture illustrated in FIG. 3 provides the same simplified vibration testing as the fixture illustrated in FIGS. 1 and 2, inasmuch as a test object being tested using the alternate embodiment of the test fixture does not have to be repositioned for testing along each of its three mutually-orthogonal axes.

Figure 6:
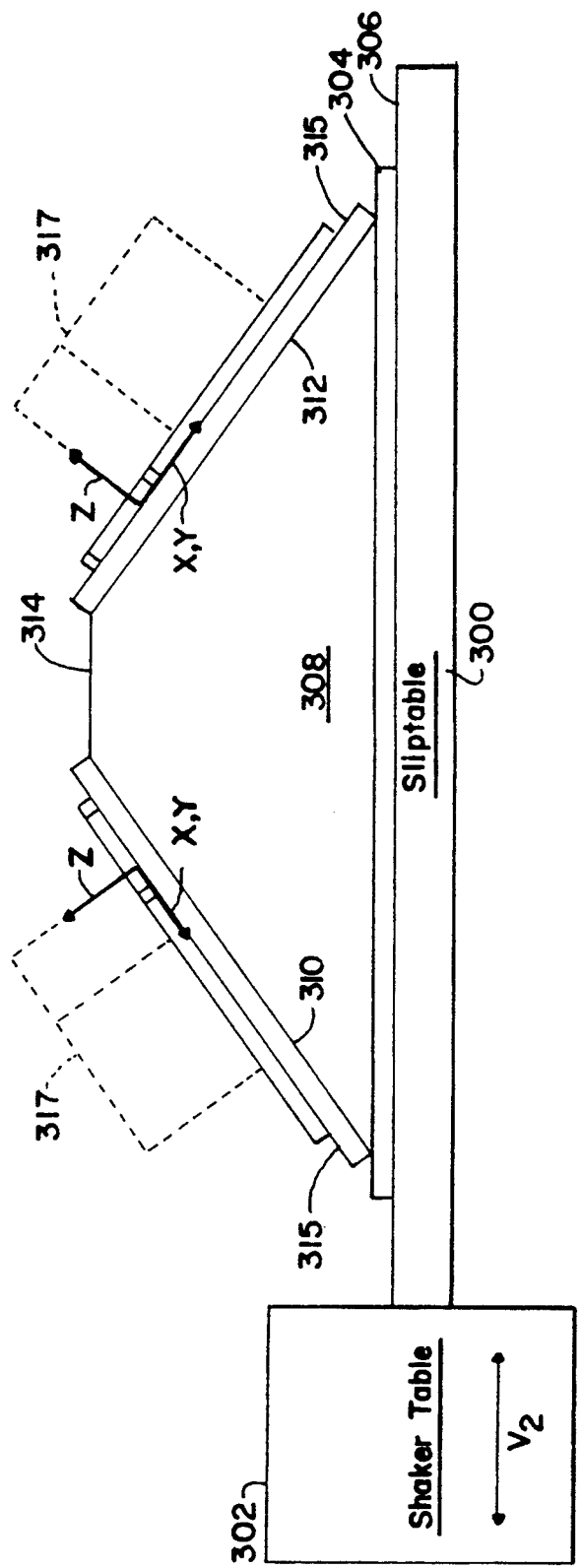
FIG. 6 is a schematically side elevational view of a vibration test apparatus comprising (1) a conventional shaker device that includes a sliptable, and (2) a test fixture made according to the present invention that comprises two object-supporting flat plates or surfaces.

FIGS. 4–6 illustrate how the invention described in my copending application Ser. No. 07/731,372, now U.S. Pat. No. 5,156,051, may be extended to provide a test fixture that is adapted to subject two to four test objects simultaneously to the same test procedure. The embodiments of FIGS. 4–6 are advantageous in that they permit an increase in the number of objects tested within a given period of time, so as to increase the productivity of the test operation. Additionally, since the calibration of different shaker tables or sliptables may vary and the absolute value of the vibrational forces provided by a particular shaker table or sliptable may vary over time, the testing of multiple objects at the same time may be advantageous for standardization from the standpoint of measurement accuracy, particularly when the test objects are intended to be utilized together in a single sensitive piece of apparatus, e.g., in airborne electronic systems. FIGS. 4 and 5 illustrate two alternative embodiments of the present invention which accomplish this objective in association with a shaker table arrangement as shown in FIGS. 1 and 2. FIG. 6 illustrates an embodiment accomplishing these objectives in association with a sliptable.

Referring specifically to FIG. 4, there is shown a test fixture 120 which comprises a pair of top plates 124 each having a substantially flat top surface 126. Top plates 124 are made from a material having suitable strength and vibration-transmissive characteristics, such as flat magnesium plate having a thickness of about one inch. Plates 124 each have a substantially straight bottom edge 128, each such edge 128 being located in a common horizontal plane.

Fixture 120 also includes attachment means shown schematically at 129, 131 attached to each of top plates 124 for securing test objects 121 in tight contact with the two flat surfaces 126 of plates 124 so that the X and Y axes of each object form a 45° angle with bottom edge 128 of the plate to which it is mounted. Such attachment means 129, 131 may be essentially the same as members 30 and 32 with bolts 38 and tapped holes in the test objects.

Test fixture 120 is mounted to a shaker table 122. Fixture 120 includes a bottom plate 140 having flat parallel top and bottom surfaces 142 and 144. Bottom plate 140 is adapted to be attached to the flat mounting surface 123 of shaker table 122 by conventional means, e.g. by bolting plate 140 to mounting surface 123. As shown in FIG. 4, when plate 140 is attached to mounting surface 123 of shaker table 122, top surface 142 of plate 140 extends in parallel with mounting surface 123.

Test fixture 120 further includes a support structure 150 for securing top plates 124 to bottom plate 140 and for supporting top plates 124 in fixed angular relationship with mounting surface 123 of shaker table 122. Support 150 may be a box-like structure, the top portion of which above converging, inclined planes 166 and 166a has been removed. Thus, in FIG. 4, the illustrated support 150 includes a front wall 152, a rear wall (not visible), a right wall 154, and a left wall (not visible). The front and rear walls are parallel to one another, and the left and right walls are also parallel to each other and at right angles to the two side walls. The walls are secured together at their adjoining side edges by welding or other suitable method so as to form a rigid, box-like structure. The walls also are attached to bottom plate 140 by welding or other suitable means so that they each extend normally to top surface 142 of plate 140. Preferably, the walls are made from a metal plate material having satisfactory strength and vibration-transmissive characteristics, e.g. one inch thick magnesium plate.

The front and rear walls are relatively short, being affixed to the bottom edges 128 of the object-supporting plates. On the other hand, the right wall 154 and the identical left wall (not visible in the drawings) have triangular extensions 155 with converging top edges 162 that extend at an angle $\theta$ with the upper surface 142 of mounting plate 140 and mounting surface 123 of the shaker device. Angle $\theta$ is preferably equal to 54.7°, although some slight variation ($\pm 0.5°$) about this angle is acceptable.

Top plates 124 are attached to the slanted top edges 162 of the two side walls of structure 158 by bolting, welding or other suitable means so that top surfaces 126 of plates 124 extend parallel to converging planes 166, 166a respectively and so that the plates remain firmly attached to support 150 during the entire vibration test.

By attaching top plates 124 to support 150 in this manner, top surfaces 126 and attachment means 129, 131 are both inclined at the angle $\theta$ with respect to mounting surface 123 of shaker table 122. As a result when a test object 121 is affixed to each of the plates 124 by means of the attachment means 129, 131, the test objects will be inclined at the angle $\theta$ relative to the plane of mounting surface 123. Similarly, because the Z axis of a test object 121 secured to the attachment means extends normally to top surface 126 of its associated plate 124, the Z axis of the test object forms an angle of $90° - \theta$ with respect to the plane of mounting surface 123, i.e., 35.3° when $\theta = 54.7°$.

FIG. 5 is illustrative of another alternative embodiment of the present invention adapted for the simultaneous vibration testing of two, three or four objects. More particularly, FIG. 5 shows a test fixture 220 which comprises four top plates 224, each having a substantially flat top surface 226. Top plates 224 are made from a material having suitable strength and vibration-transmissive characteristics, such as magnesium plate having a thickness of about one inch. Top plates 224 each include a substantially straight bottom edge 228, each such bottom edge 228 being located in a common horizontal plane parallel to the plane of the flat mounting surface 223 of shaker table 222.

Fixture 220 also includes attachment means attached to the top surfaces 226 of each of the top plates 224 for securing test objects 221 respectively thereto, so that the X and Y axes of each object form a 45° angle with the respective bottom edge of the plate to which it is attached. For convenience of illustration, such attachment means are omitted from FIG. 5. However, it is to be understood that the specimen attachment means may be like the members 30, 32 shown in FIG. 1 or the means 129, 131 shown in FIG. 4.

Test fixture 220 is attached to the mounting surface 223 of a shaker table 222. For this purpose, fixture 220 further includes a bottom plate 240 having flat parallel top and bottom surfaces 242 and 244. Bottom plate 240 is adapted to be attached to mounting surface 223 of shaker table 222 by conventional means, preferably by bolting plate 240 to mounting surface 223. Plate 240 is attached to shaker table 222 so that its top surface 242 extends in parallel with mounting surface 223.

Test fixture 220 further includes a support structure 250 for securing top plates 224 to bottom plate 240 and for supporting top plates 224, in fixed angular relationship with mounting surface 223 of shaker table 222. Support 250 may be a box-like structure. In FIG. 5, the illustrated support 250 includes a front wall 252, a rear wall (not shown), a right wall 254, and a left wall (not shown) secured together in a rectangular box configuration. Thus, the front and rear walls are parallel to one another, and the left and right walls extend parallel with one another at a right angle to the front and rear walls. The walls are secured together by welding or other suitable method so as to form a rigid, box-like structure. The four walls are attached to bottom plate 240 by welding or other suitable means so that the walls extend normally to top surface 242 of plate 240. Preferably, the walls are made from plate-like material having satisfactory strength and vibration-transmissive characteristics, e.g. one inch thick magnesium plate.

Each of the four walls of structure 250 have the same height, and each has a straight top edge 262 extending in a plane parallel to plate 240. Top plates 224 are attached to one another and also to the top edges 262 of the walls of structure 150 respectively by bolting, welding or other suitable means so that their top surfaces 226 form a truncated pyramid. Preferably, the plates meet in an overlapping arrangement as shown in FIG. 5, but they may engage one another in some other mode, such as a tongue-in-groove or mitred corners arrangement.

In the embodiment of FIG. 5, the four plates 224 are each inclined so that their top surfaces 226 extend at the angle $\theta$ with respect to mounting surface 223 of shaker table 222. Consequently, when test objects are secured to the surfaces 226 with their X and Y axes extending at 45° angles to the bottom edges 262, the Z axis of each test object forms an angle of $90° - \theta$ with respect to the plane of mounting surface 223 of shaker table 222, i.e., 35.3° when $\theta = 54.7°$.

FIG. 6 shows a test fixture for testing two test objects simultaneously using a sliptable arrangement. This embodiment of the test fixture has only two surfaces on which test objects may be mounted, due to the fact that the axis of vibration is horizontal instead of vertical.

Referring now to FIG. 6, a sliptable 300 connected for vibration along a horizontal vibration axis to shaker table 302 is provided in a manner similar to that described hereinabove with regard to FIG. 3. In this embodiment, the fixture has a flat plate 304 affixed to the upper, horizontal surface 306 of sliptable 300. A front wall member 308 and a rear wall member (not shown) arise from the plate 304 in spaced parallel relation to each other and parallel to the axis of vibration of the sliptable 300, represented as $V_2$ in FIG. 6. The wall members are affixed to the plate 304 by bolts, welding or otherwise as set forth hereinabove.

The left and right side edges 310 and 312 of the front wall member 308 converge toward each other in planes which are transverse to the vibration axis and located at an angle of approximately 34.3° to the horizontal as they extend upwardly from plate 304 towards the top edge 314 of that wall. The same is true of the rear wall member (not shown). Top specimen-mounting plates 315, which are similar to top plates 124 described above and carry similar test object attachment means (not shown) for mounting a test object 317 with its X and Y axis disposed at a 45° angle to the bottom edge of the plates, are affixed to the right and left side edges 310 and 312 of the front and rear wall members.

Use of the vibration test fixture depicted in FIG. 6 will be substantially the same as the use of the fixture depicted in FIG. 3. More specifically, assuming that sliptable 300 extends horizontally, activation of shaker table 302 will result in production of a horizontal vibration force $V_2$ which is transmitted to sliptable 300 so as to cause the latter to vibrate along its longitudinal axis in a horizontal plane. This reciprocatable vibration is transmitted via plate 304 to the test fixture and to test objects attached top plates 315. As discussed above with respect to upwardly acting vibration force V generated by shaker table 22 (FIGS. 1 and 2), vibration force $V_2$, generated by shaker table 302 can be broken down into three equal, mutually-orthogonal X, Y and Z axes.

When the test fixture shown in FIG. 6 is attached, via plate 304, to a sliptable 300 and test objects are attached to plates 315 by the test object attachment means at a 45° angle as described above, the three mutually-orthogonal X, Y and Z axes of each test object will extend along or in parallel with a corresponding respective one of the above-mentioned three equal, mutually-orthogonal force components of the horizontal vibration force $V_2$. The Z axis of each test object will extend at an angle of about 54.7° to the plane of the upper surface 306 of sliptable 300. Resultantly, vibration forces equal to 0.577 times the magnitude of vibration force $V_2$ are applied simultaneously to the test objects mounted on the outer surface of either plate 314 along each of the three mutually-orthogonal X, Y and Z axes of the object. Thus, test objects affixed to the two plates 315 may be vibration tested along their X, Y and Z axes simultaneously.

The vibration test fixture illustrated in FIG. 6 provides the same simplified vibration testing as the fixture illustrated in FIGS. 1-5, inasmuch as a test object being tested using this alternate embodiment does not have to be repositioned for testing along each of its three mutually-orthogonal axes.

In practice, measurements of the vibration forces experienced by the test objects are obtained by attaching accelerometers to each of the plates 124, 224 and 315.

Although not shown, it is to be understood that more than one test specimen may be mounted to each of the inclined plates 124, 224 and 315. Also, the construction and method of making the test fixture may be varied in ways obvious to persons skilled in the art without departing from the principles of the invention.

Since a number of other changes may be made in the above apparatus without departing from the scope of the invention herein involved, it is intended that all matter contained in the above description or shown in the accompanying drawing shall be interpreted in an illustrative and not in a limiting sense.

What is claimed is:

1. A vibration test fixture for simultaneously supporting at least two objects to be vibration tested, said vibration test fixture being designed for use with a conventional shaker device capable of generating a vibration force which extends along a predetermined vibration axis, said shaker table assembly having a substantially flat mounting table surface which extends substantially normally to said vibration axis;

said vibration test fixture comprising:

two or four substantially flat object-supporting surfaces and object-securing means for releasably securing a test object to each of said object-supporting surfaces, each of said objects having mutually orthogonal X, Y and Z axes and said object-securing means being arranged so as to secure said test objects to said object-supporting surfaces so that each object is disposed with its X and Y axes located in a plane that extends parallel to the plane of the object-supporting surface to which it is secured and extending at about a 45 degree angle to said flat mounting table surface; and means for providing a vibration transmissive connection between said substantially flat object-mounting surfaces and said mounting table surface so that said Z axes of each of said test objects form an angle equal to about 35.3°±0.5° with the plane of said mounting table surface.

2. A vibration test fixture according to claim 1 wherein said flat surfaces extend at an angle of about 54.7° to said mounting table surface.

3. A vibration test fixture according to claim 2 having four object-supporting surfaces disposed in a pyramidal configuration.

4. A vibration test fixture for simultaneously supporting two objects to be vibration tested, each of said objects having mutually-orthogonal X, Y and Z axes, said vibration test fixture being designed for use with a conventional shaker device capable of generating a vibration force which extends along a selected vibration axis, said shaker device having a substantially flat mounting table surface which extends substantially normally to said vibration axis, said vibration test fixture comprising:

two object-mounting plates disposed in converging relation to one another, each said plates having a substantially flat surface and a substantially straight bottom edge;

object-attachment means associated with each of said object-mounting plates, each of said attachment means being adapted to releasably support an object on the object-mounting plate associated therewith so that (a) said X, Y and Z axes of said object are in fixed relationship to said flat surface of said plate, (b) said X and Y axes of said object form about a 45 degree angle with respect to said straight bottom edge of said plate, and (c) said X and Y axes lie along a plane that extends in parallel with said flat surface of said plate; and means for (a) coupling said mounting plates to said mounting table surface so that vibrations are transmitted from said shaker device to said mounting plates and (b) supporting said flat surfaces of said object-mounting plates at about a 54.7 degree angle with respect to said mounting table surface.

5. A vibration test apparatus for simultaneously applying a trio of vibration forces to at least two test objects, each said object having orthogonal X, Y and Z axes, so that a corresponding respective one of said trio of vibration forces extends in parallel with each of said X, Y and Z axes of each said object, said apparatus comprising:

a shaker device for generating a vibration force which extends along a vibration axis, said shaker device having a mounting table surface which extends substantially normally to said vibration axis;

a test fixture for supporting at least two test objects for simultaneous testing, said fixture having at least two substantially flat object-supporting surfaces for releasably supporting an object to be vibration tested, and attaching means associated with each of said object-supporting surfaces for securing a test object having mutually-orthogonal X, Y and Z axes to said each object-supporting surface, said attaching means being adapted to secure a test object so that (a) said X, Y and Z axes of said test object are in fixed relationship to said object-supporting surface, and (b) said X and Y axes of said test object form about a 45° angle with respect to a first axis that extends parallel to the plane of said mounting table surface, said object-supporting surfaces each being oriented so that the plane of each surface extends at an angle relative to said mounting table surface equal to about 54.7°, and the Z axis of each test object forms a 35.3° angle with the plane of said mounting table surface;

said test fixture being coupled to said mounting table surface so as to provide a vibration transmissive connection between said flat object-supporting surfaces and said mounting table surface.

6. A vibration test fixture for simultaneously supporting two objects to be vibration tested, said vibration test fixture being designed for use with a conventional sliptable-type shaker assembly, said sliptable-type shaker assembly having a substantially flat mounting table surface and an axis of vibration which extends substantially parallel to the plane of said mounting table surface;

said vibration test fixture comprising two converging, substantially flat object-supporting surfaces located in planes that extend transversely to said vibration axis for supporting objects to be vibration tested, and means associated with each of said object-supporting surfaces for releasably securing a test object to said each object-supporting surface so that the mutually-orthogonal X, Y and Z axes of said test object are fixed relative to said each object-supporting surface with said X and Y axes extending at about a 45° angle to a first axis that extends in parallel with said flat object-supporting surfaces and said substantially flat mounting table surface, said object-supporting surfaces being disposed at an angle of about 35.3° to said mounting table surface so that said Z axis of each said object forms an angle equal to about 54.7° with said vibration axis; and means coupling said test fixture to said mounting table surface for providing a vibration transmissive connection between said flat object-supporting surfaces and said sliptable shaker assembly.

7. A vibration test fixture for simultaneously supporting two objects to be vibration tested, each said object having mutually-orthogonal X, Y and Z axes, said vibration test fixture being designed for use with a conventional sliptable assembly capable of being vibrated along a vibration axis, said sliptable assembly having a substantially flat mounting table surface which extends substantially parallel to said vibration axis;

said vibration test fixture comprising two object-mounting plates, each of said plates having a substantially flat surface extending transversely to said vibration axis and a substantially straight bottom edge, and attachment means adapted to releasably support a test object on each of said flat surfaces so that (a) said X, Y and Z axes of said test object are in fixed relationship to the flat surface upon which said test object is supported, (b) said X and Y axes of each of said objects form about a 45° angle with respect to said straight bottom edge of the plate upon which said object is supported, and (c) said X and Y axes of said object lie along a plane that extends in parallel with said flat surface of the plate upon which said object is supported, said plates being secured in fixed converging relation to one another with each plate being disposed at an angle of about 35.3° to said mounting table surface and said vibration axis; and means for attaching said test fixture to said mounting table surface so as to transmit vibrations from said sliptable assembly to said object-mounting plates and the objects supported by said object-mounting plates.

8. A vibration test apparatus for simultaneously applying a trio of vibration forces to two objects each having mutually-orthogonal X, Y and Z axes so that a corresponding respective one of said trio of vibration forces extends in parallel with each of said X, Y and Z axes of each said object, said apparatus comprising:

a sliptable assembly for generating a vibration force which extends along a vibration axis, said sliptable assembly having a mounting table surface which extends substantially parallel to said vibration axis;

test object support means having two substantially flat surfaces located transversely to said vibration axis, each said surface being adapted for releasably supporting a test object to be vibration tested so that (a) said X, Y and Z axes of said object are in fixed relationship to the flat surface upon which said object is supported, (b) said X and Y axes of said object form about a 45° angle with respect to a first axis that extends in parallel with both said flat surface and said mounting table surface, and (c) said X and Y axes lie along a plane that extends in parallel with the flat surface upon which said object is supported; and means for coupling said support means to said mounting table surface for providing a vibration transmissive connection between said flat mounting surfaces and said mounting table surface so that the said Z axis of each test object secured to said object-mounting surfaces forms about a 54.7° angle with respect to said vibration axis and said mounting table surface.

* * * * *